(12) United States Patent
Takahashi

(10) Patent No.: US 6,798,895 B1
(45) Date of Patent: Sep. 28, 2004

(54) CHARACTER STRING EXTRACTION AND IMAGE PROCESSING METHODS AND APPARATUS

(75) Inventor: Hiroyasu Takahashi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 09/680,018

(22) Filed: Oct. 5, 2000

(30) Foreign Application Priority Data

Oct. 6, 1999 (JP) .......................................... 11-285177

(51) Int. Cl.[7] .............................. G06K 9/34; G06K 9/46
(52) U.S. Cl. ...................... 382/101; 382/177; 382/180; 382/190
(58) Field of Search ................................ 382/177, 101, 382/102, 181, 190, 229, 180

(56) References Cited

U.S. PATENT DOCUMENTS

| | | | | |
|---|---|---|---|---|
| 5,033,104 A | * | 7/1991 | Amano ........................ | 382/177 |
| 5,410,611 A | * | 4/1995 | Huttenlocher et al. ...... | 382/177 |
| 5,680,479 A | * | 10/1997 | Wang et al. ................. | 382/176 |
| 5,818,978 A | * | 10/1998 | Al-Hussein .................. | 382/296 |
| 5,892,843 A | * | 4/1999 | Zhou et al. .................. | 382/176 |
| 6,157,738 A | * | 12/2000 | Wang .......................... | 382/199 |
| 6,246,794 B1 | * | 6/2001 | Kagehiro et al. ........... | 382/185 |

* cited by examiner

Primary Examiner—Jon Chang
(74) Attorney, Agent, or Firm—Thu Ann Dang

(57) ABSTRACT

A character string extraction apparatus comprises: a connected component (CC) detector for detecting, in a binary image, connected components (CC) comprising black pixels; a character-sized connected component (CharCC) extraction unit for extracting character-sized connected components (CharCC) having an appropriate size from the detected connected components; a horizontal extension unit and a vertical extension unit for extending the extracted character-sized connected components in an assumed character string direction, and for reducing the character-sized connected components in a direction perpendicular to the assumed character string direction; long connected component (LongCC) extraction units and for connecting a plurality of the thus obtained connected components in the assumed character string direction, and for extracting a long connected component; and a character string selector for employing the extracted long connected component to determine a character string for image recognition.

14 Claims, 14 Drawing Sheets

CHARACTER STRING EXTRACTION AND IMAGE PROCESSING METHODS AND APPARATUS

FIELD OF THE INVENTION

The present invention relates to image processing methods and apparatus used, for example, for an automatic mailing address reader, and in particular to image processing methods and apparatus that extract an irregular character string, such as an address that has been handwritten in Japanese.

BACKGROUND OF THE INVENTION

The postal service system, for example, daily must process a large amount of mail within a short period of time. And thus, since until recently all mail had to be sorted visually and manually, the size of the work load borne by postal service employees has been very large. To reduce this work load, mechanization, represented by automatic readers, has been introduced, and this has led to the development of an advanced procedure whereby mail to be delivered is sorted by district. This way of handling mail has been successful in Japan because postal codes are entered in boxes provided for them on mailing matter; however, for overseas mail, for which no clearly defined spaces for postal code entries are provided, it is difficult to mechanically determine where on mailing matter postal codes are located. Moreover, since it is anticipated that the amount of overseas mail processed will continually increase, currently a demand exists for the continued development of present techniques to permit the immediate reading of address information, including postal codes, carried by mail, and for sorting the mail for delivery by districts.

Although there is a strong demand for the extraction of postal codes carried by mailing matter for which postal code entry areas are not defined, and for the reading of address information, it is difficult to use current techniques for these purposes. This is primarily because on the exterior surfaces of the various items that constitute the mail, not only are there areas provided for recipient addresses, but there may be other areas in which sender addresses are entered, areas in which advertising material is presented, and areas in which various patterns, such as drawings and photographs, are displayed. Further compounding the problem are the many ways in which entries are made, including the use of handwritten and mechanically printed characters, and of vertical and horizontal writing styles. As a result, in order to correctly separate postal codes and other address data from the various coexisting information entries carried by the mail, a very complicated process must be employed, such as one that provides for the examination of all external surfaces. For addresses that have been handwritten in Japanese, in particular, not only does a problem exist because both vertical and horizontal writing styles are used, but there is a further problem in that the handwritten characters used in the addresses are irregularly shaped, which makes the extraction of appropriate addresses especially difficult.

Of the conventional methods that are used to extract address information, techniques exist by which address areas and actual addresses can be identified and read. Included is a method whereby it is presumed that labels bearing printed addresses are attached to mail. For this method the reflection attributes of the labels, or the shadows thrown by the edges of the labels, are detected and the address areas are thereafter extracted. There is also a method whereby horizontal and vertical projections of the mail are obtained and are used to select probable address areas, in which zones containing high entry densities are defined as character rows. In addition, in Japanese Unexamined Patent Publication No. Hei 7-265807, a technique is disclosed whereby to extract character rows, connected components that are near each other are joined together, and the character rows are later combined to define probable address areas.

However, when addresses are printed directly on external surfaces, the method whereby address areas are extracted from accompanying entries by presuming that printed address labels are attached to mail is definitely useless. According to this method, the available mail types are very limited. And it is particularly difficult to apply this technique for addresses that are handwritten in Japanese, since in this case, labels are seldom used. Also, with the method used to select probable mailing address areas by defining as character rows zones having high entry densities, it is difficult to separate address areas from their backgrounds if the backgrounds contain large numbers of image data, and if complicated patterns are displayed on the mail. As a result, with this method correct address areas can not precisely be detected.

Especially when the technique disclosed in Japanese Unexamined Patent Publication No. Hei 7-265807 is used, it is presumed that comparatively characters are regularly aligned, and that character strings are arranged relatively near each other. Thus, although this technique can more or less be applied for printed addresses, satisfactory results can not be expected when the technique is used for irregular handwritten addresses. Furthermore, according to this technique, a complicated joining process must be performed for all pixels, i.e., portions from which pixels are accumulated are detected by examining all pixels, and this detailed examination must be repeated for each portion involved. As a result, logic operations are very difficult, processing speeds are greatly reduced, and configurations are much too complicated. Therefore, as a system configuration, this method is not realistic.

SUMMARY OF THE INVENTION

It is, therefore, one object of the present invention to avoid the use of a complicated process to combine pixels, and to quickly and precisely extract character strings such as are contained in handwritten addresses.

It is another object of the present invention to extract character strings that are irregularly arranged but that practically can be assumed to constitute an address.

It is an additional object of the present invention to extract character strings by employing a flexible and simple process for mail images, such as ones whereon vertical and horizontal writing styles coexist.

It is a further object of the present invention to employ different algorithms for regularly arranged character strings, such as printed character strings, and for irregularly arranged character strings, such as addresses that are handwritten in Japanese, so as to flexibly and accurately extract character strings.

To achieve the above and other objects, according to the present invention, a character string extraction method comprises the steps of: extracting connected components from an input image; comparing the sizes of the connected components with a predetermined threshold size, and extracting connected components occupying a range within the predetermined threshold size; extending vertically or horizontally the extracted connected components occupying a range within the predetermined threshold size, and connecting the extended connected components to form and extract long connected components; and extracting probable character strings based on the connection state of the extracted long connected components.

The step for extracting the connected components can be a method whereby an 8-connected component arranged vertically, horizontally or obliquely, or a 4-connected component arranged vertically or horizontally, is employed to extract connected components occupying a range within a predetermined threshold size.

At the step for extracting the connected components occupying a range within the predetermined threshold size, the connected components occupying the range within the predetermined threshold size may be extracted by comparing the vertical and/or horizontal size of the connected components with a predetermined vertical and/or horizontal size for an assumed character. According to this method, since the comparison is performed by defining a threshold value while taking into account the size of a handwritten character and an assumed character size, the connected components can be detected, while noise is removed from mail whereon patterns coexist. More specifically, if the height and/or width of a connected component is equal to or smaller than a first constant value (e.g., 110 points at a reduced resolution of four lines/millimeter), it can be ascertained that the pertinent connected component occupies a range within the threshold size.

It is preferable that, at the step of extracting the long connected components, the size to be extended be changed based on the size of the connected components occupying a range within the predetermined threshold size, so that the long connected components can be extracted. Thus, this process can cope with the sizes of a variety of handwritten characters. More specifically, if L is the length used to extend the connected components occupying a range within the threshold size, the pertinent connected components can at either end be extended a distance equal to the length L.

In addition, it is preferable that, at the step of extracting the long connected components, the horizontal size of the connected components occupying a range within the predetermined threshold size be reduced when the vertical size is extended, and that the vertical sizes of the connected components occupying a range within the predetermined threshold size be reduced when the horizontal size is extended, so that the long connected components can be extracted. Thus, character strings can be extracted while contact between adjacent character strings is avoided.

Furthermore, it is preferable that at the step of extracting the long connected components the size to be reduced be changed based on the size of the extracted connected components that occupy a range within the threshold size. As a result, as is described above, this process can cope with handwritten characters having a variety of sizes.

The character string extraction method further comprises the steps of: dividing the input image into segments while assuming that the segments are mesh images having a predetermined size, and setting to the ON state the mesh images that correspond to the connected components that occupy a range within the predetermined threshold size that is extracted; and extracting the contents of a specific area from the connection state of mesh images that are in the ON state.

In addition, the character string extraction method further comprises: shifting to the step of setting the mesh image to the ON state when the image represents an address composed of printed characters; and shifting to the step of extracting the long connected components when the image represents an address composed of handwritten characters. As a result, a simpler area extraction method can be used for an area containing an address consisting of printed characters, and the processing speed can be increased.

The method for which the mesh images are employed to extract the contents of a specific area is a method that involves the changing to meshes of pixel units constituting areas having a predetermined quadrilateral size, and the simplification of the meshes by regarding each of them as a single point. Thus, compared with a conventional system, an address area can be quickly detected by using a simple algorithm.

Also, to achieve the above objects, a character string extraction method according to the present invention comprises the steps of: extracting connected components having a predetermined size from an input image in which handwritten characters are included; extending the connected components in one direction and reducing the connected components in the other direction in order to assume a string exists that has a plurality of characters; detecting the state of the string of characters that is assumed; and inferring an address pattern from the state of the string of characters that is detected.

It is preferable that the state of the string of characters indicate the length and the raised and recessed condition of the string, and that a high priority for the performance of character recognition be given to a string that is long and has few raised and recessed portions. As a result, a more appropriate character string can be extracted that qualifies as a probable address character string.

Further, the vertical or the horizontal size of the connected components is extended at a predetermined ratio, while the other size is reduced at a predetermined ratio, and the connection state of the connected components that are extended and reduced is employed to assume the existence of the string of characters.

Furthermore, to achieve the above and other objects, a character string extraction apparatus according to the present invention comprises: a connected component detector for detecting, in a binary image, connected components consisting of black pixels; a character-sized connected component extraction unit for extracting character-sized connected components having an appropriate size from the connected components detected by the connected component detector; a connected component extension/reduction unit for extending, in an assumed character string direction, the character-sized connected components extracted by the character-sized connected component extraction unit, and for reducing the character-sized connected components in a direction perpendicular to the assumed character string direction; a long connected component extraction unit for connecting, in the assumed character string direction, a plurality of the connected components obtained by the connected component extension/reduction unit, and for extracting a long connected component; and a character string selector for employing the long connected component extracted by the long connected component extraction unit to determine a character string for image recognition.

And in addition, it is preferable that the character-sized connected component extraction unit extract the character-sized connected components based on a threshold value, which is defined while taking into consideration the size of the handwritten characters inscribed on the mail.

The assumed character string direction is vertical when the character string under consideration is a vertically written address, or is horizontal when the character string under consideration is a horizontally written address.

Further, to achieve the above and other objects, an image processing apparatus according to the present invention comprises: image input means for entering an image; a connected component extraction means for extracting from the image input means, entered using the image input means, having a predetermined size; long vertical connected component generation means for vertically extending and horizontally reducing the connected components extracted by the connected component extraction means to obtain long vertical connected components; long horizontal connected component generation means for horizontally extending and vertically reducing the connected components extracted by the connected component extraction means to obtain long horizontal connected components; long connected component extraction means for vertically connecting a plurality of the long vertical connected components obtained by the long vertical connected component generation means, and for horizontally connecting a plurality of the long horizontal connected components obtained by the long horizontal connected component generation means to extract long connected components; probable character string extraction means for extracting probable character strings based on the long connected components that are extracted by the long connected component extraction means; and image recognition means for performing image recognition for the probable character strings that are extracted by the probable character string extraction means.

From among the long connected components extracted by the long connected component extraction means, the probable character string extraction means outputs a longer connected component for which a higher priority is provided.

It is preferable that, to determine a priority, the probable character string extraction means reduce evaluation scores for connected components where the long vertical connected components and the long horizontal connected components intersect. Thus, an image processing apparatus can be provided that avoids the extraction of a false character string and that is superior for practical use.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The preferred embodiment of the present invention will now be described in detail, while referring to the accompanying drawings.

Figure 1:
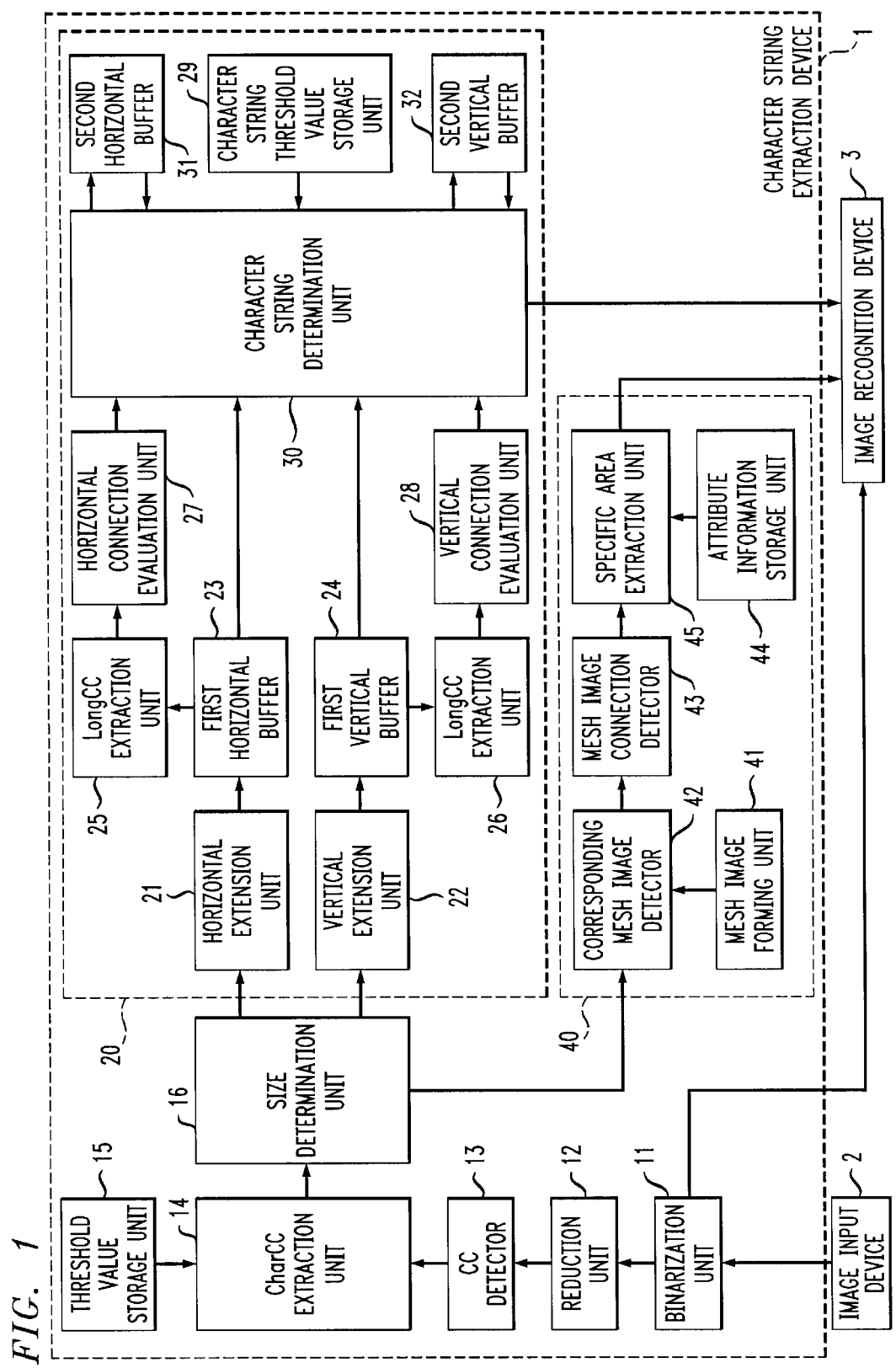
FIG. 1 is a diagram for explaining the overall arrangement of an image processing apparatus according to one embodiment of the present invention.

FIG. 1 is a diagram for explaining the overall arrangement of an image processing apparatus according to one embodiment of the present invention. As is shown in FIG. 1, the image processing apparatus in this embodiment mainly comprises a character string extraction device 1, an image input device 2 and an image recognition device 3. The image input device 2 includes: a scanner, which has a line sensor in the primary scanning direction that it drives in the sub-scanning direction when reading an image; and an optical character reader, which employs photos to read an inclusive image, so that an image of the entire address bearing surface of a piece of mail can be obtained. The image input device 2 also includes a photoelectric converter (not shown) for converting an optical image signal into an electric signal.

The character string extraction device 1 in this embodiment will now be explained. A binarization unit 11 converts an electric signal output by the image input device 2 into a binary signal for a white pixel and a black pixel; it also removes weak noise. It should be noted here that the image input device 2 may include binarization means, and may transmit an obtained binary signal to the character string extraction device 1; in which case a binarization unit 11 is not required for the character string extraction device 1. A reduction unit 12 is also provided that reduces binary image data by converting images having a resolution of 8 lines/millimeter (mm) into images having a resolution of four lines/mm; a reduction process that is performed to increase the processing speed. An example reduction method that is used for this is one whereby continuous lines are employed for an AND operation, and the obtained result is output. However, since area extraction accuracy is deteriorated when this method is used, if the processing speed is satisfactory, the reduction unit 12 is not required. Further, the order in which the binarization unit 11 and the reduction unit 12 are arranged may be inverted.

The image data processed by the reduction unit 12 are transmitted to a connected component (CC) detector 13, which, in this embodiment, extracts from the binary image data all 8-connected components. An 8-connected component is extracted by capturing a group of black pixels connected horizontally, vertically or obliquely, each other. A method for the extraction of 4-connected components arranged vertically or horizontally can also be employed to detect connected components (CCs). However, since in this case the oblique pixel connection arrangement is eliminated, it is preferable, while taking the oblique connection into account, that 8-connected components be commonly employed.

A threshold value for a connected component (CC) is stored in a threshold value storage unit 15 to determine character size. And a character-sized connected component (CharCC) extraction unit 14 compares connected components (CCs) detected by the connected component (CC) detector 13 with the threshold value, and extracts a character-sized connected component (CharCC), which is a connected component occupying a range within the limits set by the threshold value. In this case, a maximum constant value of 110, for example, is stored in the storage unit 15 as a condition for ensuring that the height/width of a connected component (CC) is smaller than a predetermined value. This value is provided to eliminate large printed patterns or long ruled lines on mail, and in accordance with this value, a connected component that exceeds 110 pixels, or about 27 mm at a resolution of 4 lines/mm, will not be accepted as a character-sized connected component (CharCC). In addition, a value of 3 or more for the short side of a rectangular area and a value of 8 or more for the long side are stored as a condition that ensures the rectangular area (quadrilateral area) of a connected component (CC) exceeds a predetermined size. While taking into account the fact that fine lines can be noise, such as is produced by the edges of a label, and that broken lines must be eliminated, these values are so designated that a rectangular area of 3×8 pixels or smaller is not considered a character-sized connected component (CharCC).

The character-sized connected component (CharCC) extracted by the character-sized connected component (CharCC) extraction unit 14 is transmitted to a size determination unit 16. The size determination unit 16, for example, measures the pitch of a large character-sized connected component (CharCC). By this means it is ascertained that a connected component having a large pitch is probably a handwritten character, and that a connected component having a small pitch is probably a printed character. This determination is based on the fact that pitches between handwritten characters tend to be irregular, and when irregularities in character pitches are found, it is ascertained that it is less probable that a pertinent connected component will be printed characters. When the size determination unit 16 determines that the pertinent character-sized connected component is probably a handwritten character, a handwritten character string extraction unit 20 extracts the character string. When the size determination unit 16 determines that the pertinent character-sized connected component is probably a printed character, a printed character string extraction unit 40 extracts the character string. The size determination unit 16 can employ other arbitrary determination methods, such as a method for measuring the frequency distribution of character-sized connected components (CharCCs) of each size, or a combination of these methods.

The arrangement of the handwritten character string extraction unit 20 in this embodiment will now be explained. When the size determination unit 16 determines that a character-sized connected component is probably a handwritten character, it is assumed that the character string directions are the vertical and the horizontal directions, and the processes for the individual directions are independently performed. First, for the process performed while assuming that the character string direction is horizontal, a horizontal extension unit 21 extends the extracted character-sized connected component (CharCC) in the horizontal direction, which is the assumed character string direction, and reduces the pertinent connected component in the vertical direction, which is perpendicular to the assumed character string direction. The resultant character-sized connected component (CharCC) is stored in a first Hor buffer 23. A long connected component (LongCC) extraction unit 25 connects the thus obtained character-sized connected components (CharCCs) to extract a long horizontal connected component (LongCC). A horizontal connection evaluation unit 27 evaluates the connection state of the extracted long connected component (LongCC), and outputs an evaluation score to a character string determination unit 30.

For the process performed while assuming that the character string direction is the vertical direction, a vertical extension unit 22 extends the extracted character-sized connected component (CharCC) in the vertical direction, which is the assumed character string direction, and reduces the pertinent connected component in the horizontal direction, which is perpendicular to the assumed character string direction. The resultant character-sized connected component (CharCC) is stored in a first Ver buffer 24. A long connected component (LongCC) extraction unit 26 connects the thus obtained character-sized connected components (CharCCs) to extract a long vertical connected component (LongCC). A vertical connection evaluation unit 28 evaluates the connection state of the extracted long connected component (LongCC), and outputs the evaluation score to the character string determination unit 30.

The character string determination unit 30 sorts the long connected components (LongCCs), stored in both the first Hor buffer 23 and the first Ver buffer 24, in the descending order of the evaluation scores that are output by the horizontal connection evaluation unit 27 and the vertical connection evaluation unit 28. Also, based on threshold value data stored in a character string threshold value storage unit 29, the character string determination unit 30 determines whether the evaluation score awarded for the long connected component that has been sorted is equal to or greater than a threshold value. If the evaluation score is equal to or greater than the threshold value, the pertinent connected component is determined to be a character string. In this embodiment, as will be described later, if a specific long horizontal connected component (LongCC) is determined to be a character string, that connected component (LongCC) is employed as a score reduction factor to later determine a vertical character string that intersects the connected component (longCC). Therefore, if the long connected component (LongCC) is extended horizontally, quadrilateral area information for score reduction (a circumscribed rectangle for a LongCC) is stored in a second Ver buffer 32 for orthogonal score reduction. Similarly, if the long connected component (LongCC) is extended vertically, quadrilateral area information for score reduction is stored in a second Hor buffer 31 for orthogonal score reduction. The character string determination unit 30 re-sorts probable character strings in order by sequentially reducing the evaluation scores, and transmits character string data, in the descending order of the evaluation scores, to the image recognition device 3. The image recognition device 3 receives a binary signal representing a complete image from the binarization unit 11 and character string data from the character string determination unit 30, and generally employs these data to extract a plurality of probable address areas. The image recognition device 3 reads addresses sequentially, in the descending order of their evaluation scores or priorities. And when satisfactory results are obtained, the reading process is terminated.

The arrangement of the printed character string extraction unit 40 for this embodiment will now be described. The printed character string extraction unit 40 processes characters for which the character-sized connected component (CharCC) is comparatively small, e.g., 30 pixels at a resolution of 4 lines/mm as a threshold value, i.e., about 8 mm or smaller.

A mesh image forming unit 41 divides an image into small areas and assumes the existence of simplified quadrilateral areas of one point each, i.e., forms comprising so-called mesh images. According to this mesh division method, the size of a mesh can be determined as being one that occupies a range equal to the size assumed for a large character in an assumed address. For example, if the maximum character-sized connected component (CharCC) consists of 30 pixels, quadrilateral areas consisting of small segments having predetermined sizes of 24×24 pixels can be employed to form meshes.

A corresponding mesh image detector 42 examines mesh images, which are assumed to be quadrilateral areas by the mesh image forming unit 41, to determine a mesh image to which a character-sized connected component (CharCC), an extracted connected component occupying a range within the threshold value, belongs (or, to which it corresponds). The corresponding mesh image detector 42 then selects a corresponding quadrilateral area, and sets the mesh images to the ON state. The detection method can be a method for setting to the ON state a mesh image to which the center coordinates of extracted character-sized connected components (CharCCs) belong. There is also another method whereby, when a smaller mesh is assumed by the mesh image forming unit 41, a mesh image on which the rectangle of a character-sized connected component (CharCC) is even partially superimposed is set to the ON state. Upon receiving the output of the corresponding mesh image detector 42, a mesh image connection detector 43 detects the connection status of meshes that are in the ON state. At this time, assuming that mesh units that are vertically and horizontally sandwiched between meshes that are in the ON state are set to the ON state, these meshes are regarded as belonging to the same area, even though they are separated by a distance equivalent to one row. In addition, among the mesh images, 4-connected meshes, vertical and horizontal connections, or 8-connected meshes, vertical, horizontal and oblique connections (Connected Mesh: CM) are detected.

Upon receiving the results obtained by the mesh image connection detector 43, a specific area extraction unit 45 adds to the results attribute information obtained from an attribute information storage unit 44, and extracts a probable address area. Threshold value information is stored as a probable address area in the attribute information storage unit 44 in order to select an appropriate size for the address area. In addition, attribute information is also stored to indicate whether there is a character string extending along two or more lines, whether the number of connected components (CCs) is adequate, or whether the shape of a character string has the appearance of an address. Since address information for mail is normally positioned near the center of an external surface, attribute information is also stored that indicates whether a pertinent area is nearer the edge or the center of an image representing the entire address bearing surface. The specific area extraction unit 45 employs the attribute information obtained from the attribute information storage unit 44 to provide an evaluation point for the connected mesh (CM) obtained by the mesh image connection detector 43, and extracts a specific area as a probable address area. As a result, the designation of probable address areas can be limited, and only a few locations output to the image recognition device 3 for the actual address identification processing. Therefore, the address reading accuracy can be considerably improved, and the address reading speed can be increased. The image recognition device 3, which is the post-processor for the printed character string extraction unit 40, receives a binary signal representing a complete image from the binarization unit 11 and area information from the specific area extraction unit 45, and employs these data to perform the reading of address areas in accordance, for example, with the descending order of their evaluation scores or priorities. When satisfactory results are obtained, the reading process is terminated.

As is described above, the printed character string extraction unit 40 in this embodiment employs a method for changing the pixel units to meshes constituting areas having a predetermined size, and for simplifying the meshes by regarding each of them as a single point. Thus, compared with the conventional system, an address area can be quickly detected by using a simple algorithm. Furthermore, since character size or an address, the mesh connection condition, and the attribute information are taken into consideration when selecting an area, precise extraction of an area can be performed. In addition, since address reading is performed in accordance with the descending order of evaluation point rankings or priorities, the wasteful expenditure of resources for address reading is eliminated to the extent possible, and the efficient reading of addresses can be quickly performed.

It is to be appreciated that one or more components of the image processing apparatus shown in FIG. 1 may be implemented in accordance with one or more computer systems. By way of example, each computer system may comprise a processor, memory and I/O devices. It is to be appreciated that the term "processor" as used herein is intended to include any processing device, such as, for example, one that includes a CPU (central processing unit) and/or other processing circuitry suitable for performing and/or controlling character string extraction and image processing operations. The term "memory" as used herein is intended to include memory associated with a processor or CPU, such as, for example, RAM, ROM, a fixed memory device (e.g., hard drive), a removable memory device (e.g., diskette), etc. In addition, the term "input/output devices" or "I/O devices" as used herein is intended to include, for example, one or more input devices for inputting data to the processing unit, and/or one or more output devices for presenting query results and/or other results associated with the processing unit. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Of course, one of ordinary skill in the art will realize various other arrangements for implementing the present invention.

The mail address reading processing performed in the embodiment will now be described while referring to FIGS. 1 to 14.

Figure 2:
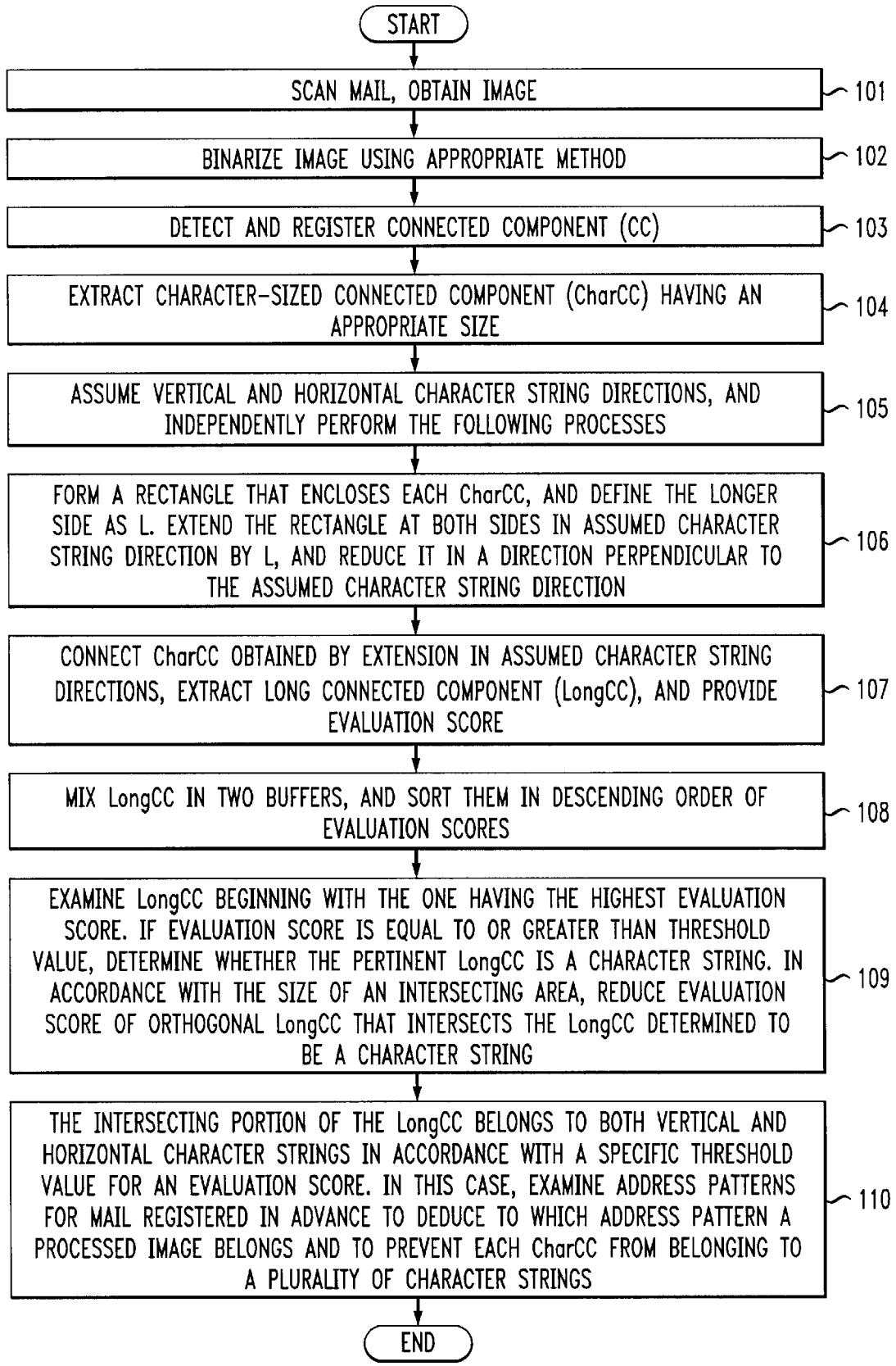
FIG. 2 is a flowchart for explaining the main processing performed to read a mailing address for handwritten character strings according to the embodiment of the present invention.

FIG. 2 is a flowchart for explaining the mail address reading process that in this embodiment is mainly performed for handwritten character strings. FIGS. 3 to 8 are diagrams showing, as the first practical example, an original image (FIG. 3), the condition (FIG. 4) where a character-sized connected component (CharCC) is extracted, the condition (FIG. 5) where long horizontal connected components (horizontal LongCCs) are extracted, the condition (FIG. 6) where long vertical connected components (vertical LongCCs) are extracted, the condition (FIG. 7) where character strings are determined and arranged in order, and the condition (FIG. 8) where the results are superimposed on the original image to represent the extracted character strings.

Figure 3:
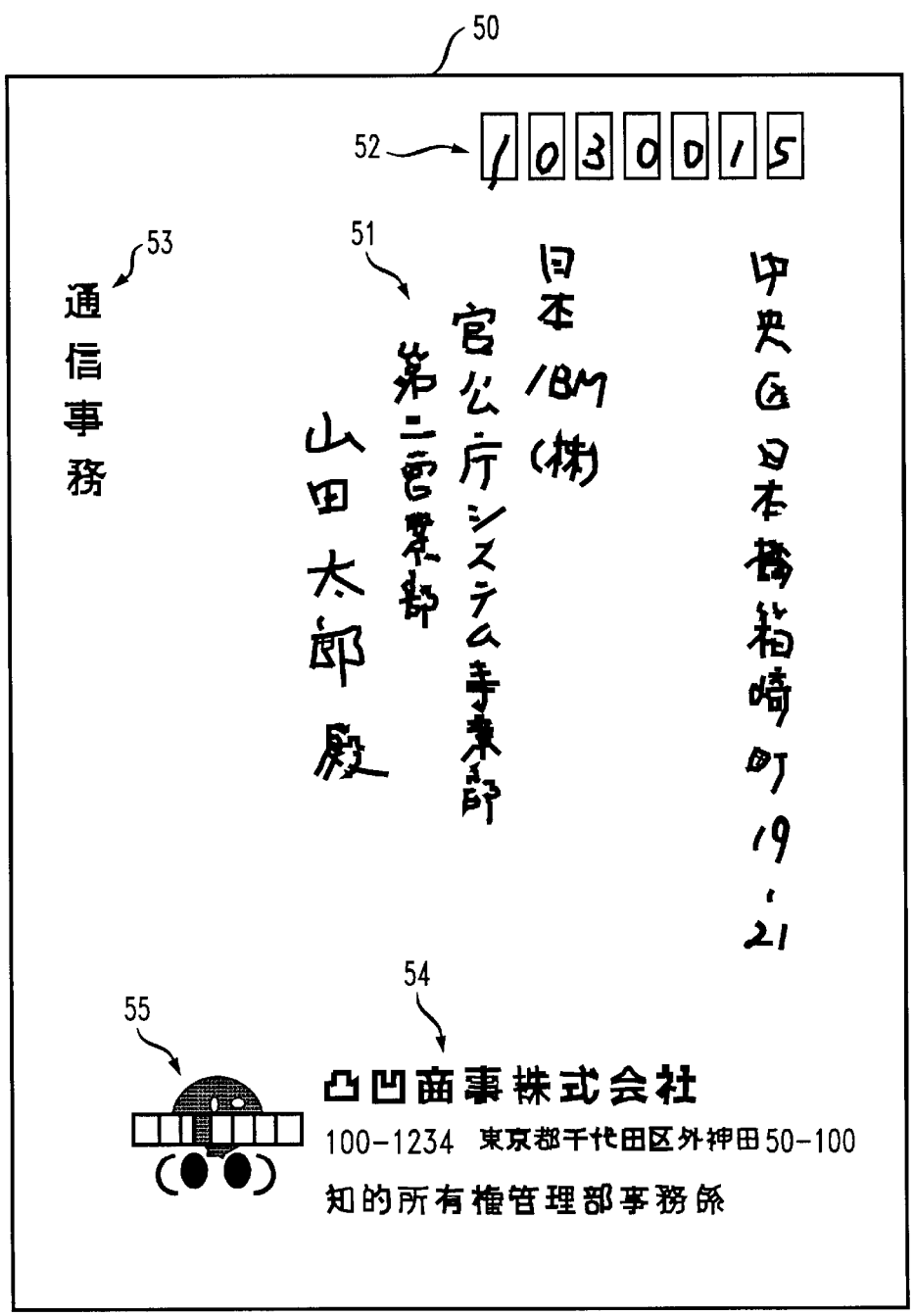
FIG. 3 is a diagram showing the original image for the first practical example.
Figure 4:
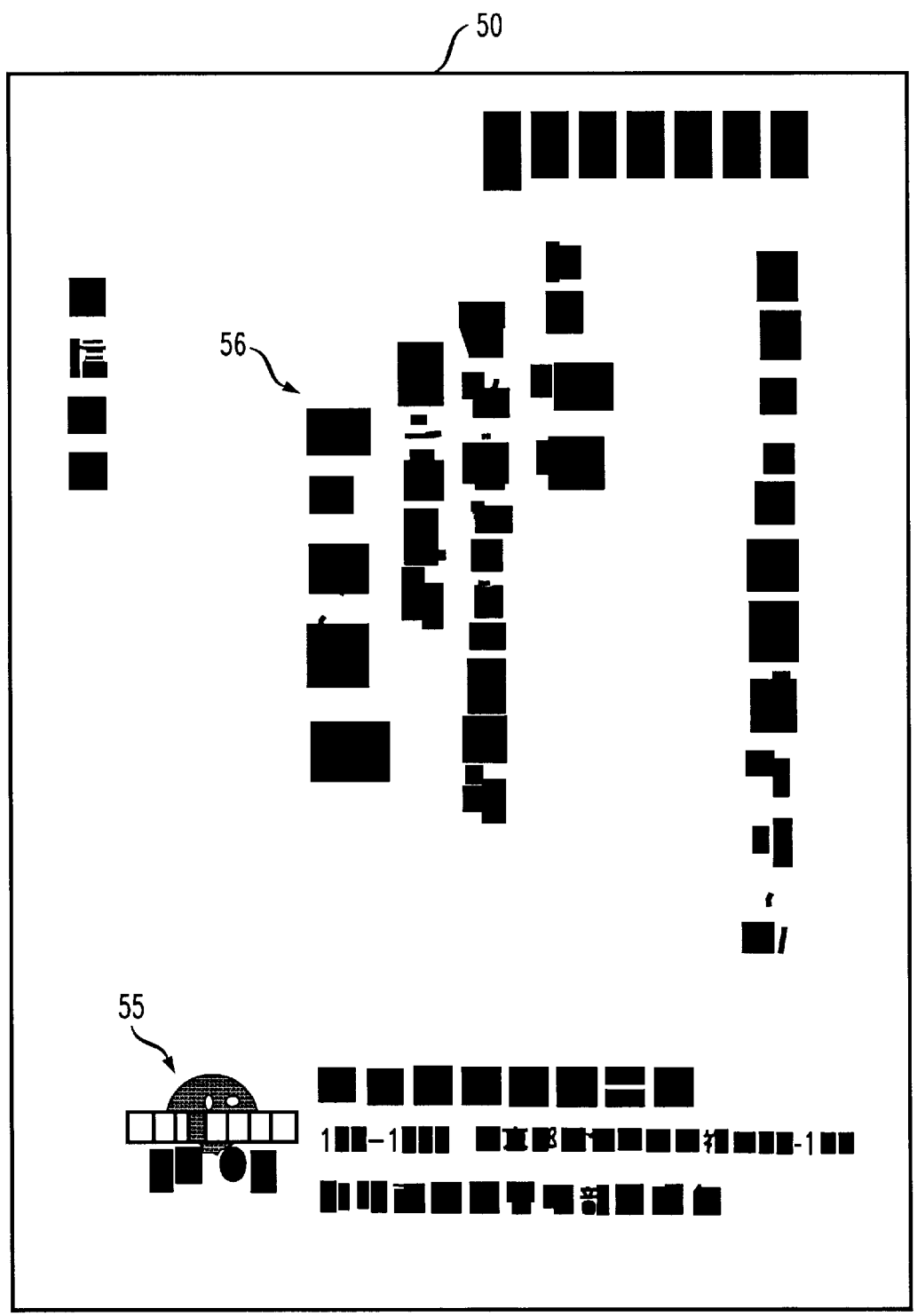
FIG. 4 is a diagram showing the existing state when character-sized connected components (CharCCs) are extracted in the first practical example.

First, mail is scanned by the image input device 2 (step 101). In FIG. 3, various image information items, such as address information 51, a postal code 52, distribution information 53, sender information 54 and a pattern 55 are inscribed on a piece of mail 50. These image data are binarized by the binarization unit 11 using an appropriate method (step 102). The connected component detector 13 detects connected components (CCs) and stores them in a memory (not shown) (step 103). The character-sized connected component (CharCC) extraction unit 14 compares the connected component (CC) with the threshold value stored in the threshold value storage unit 15, and extracts character-sized connected components (CharCCs) having appropriate sizes (step 104). In FIG. 4, character-sized connected components (CharCCs) 56 are formed into long rectangular shapes, and are superimposed on the original image so that they may be easily understood. In FIG. 4, almost all the characters are extracted as character-sized connected components (CharCCs) 56 of various sizes. It should be noted that a dot and a Chinese character are not extracted because they do not satisfy the threshold condition. Further, it is found that most of the portions of which the pattern 55 consists are also not extracted.

Assuming that the character string directions are vertical and horizontal directions, the following processes are independently performed (step 105). First, the horizontal extension unit 21 and the vertical extension unit 22, which are the connected component extension/reduction units, form rectangles that enclose each character-sized connected component (CharCC), and define the longer side of each rectangle as L. The extension units 21 and 22 extend the rectangles at both ends in the assumed character string direction (the vertical or horizontal direction) by L, and reduce the rectangle in the direction perpendicular to the assumed character string direction by (⅔)·L, for example (step 106). As a result, long vertical and long horizontal connected components (LongCCs) are formed.

Figure 5:
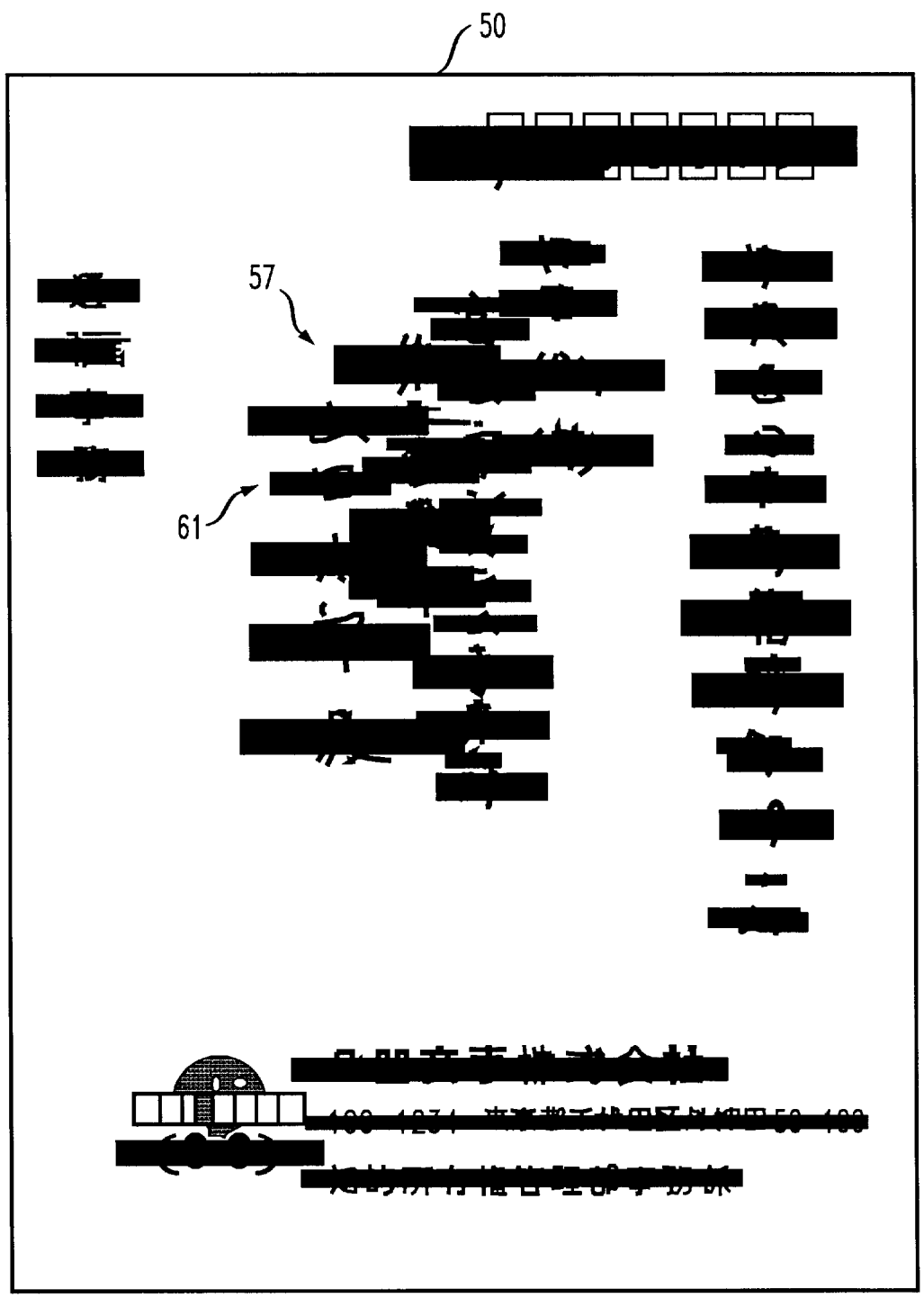
FIG. 5 is a diagram showing the state wherein long horizontal connected components (horizontally LongCCs) are extracted in the first example.

FIG. 5 is a diagram showing the condition where the rectangles that enclose the character-sized connected components (CharCCs) are extended horizontally and reduced vertically, and the resultant rectangles are superimposed on the original image for easy understanding. It should be noted that the characters of the original image are not employed for the following character string determination process. As is shown in FIG. 5, the circumscribed rectangles of the character-sized connected components (CharCCs) are extended horizontally to obtain long, connected horizontal connected components (LongCCs) 57. Further, since the rectangles are reduced vertically, connections with adjacent character strings are avoided.

Figure 6:
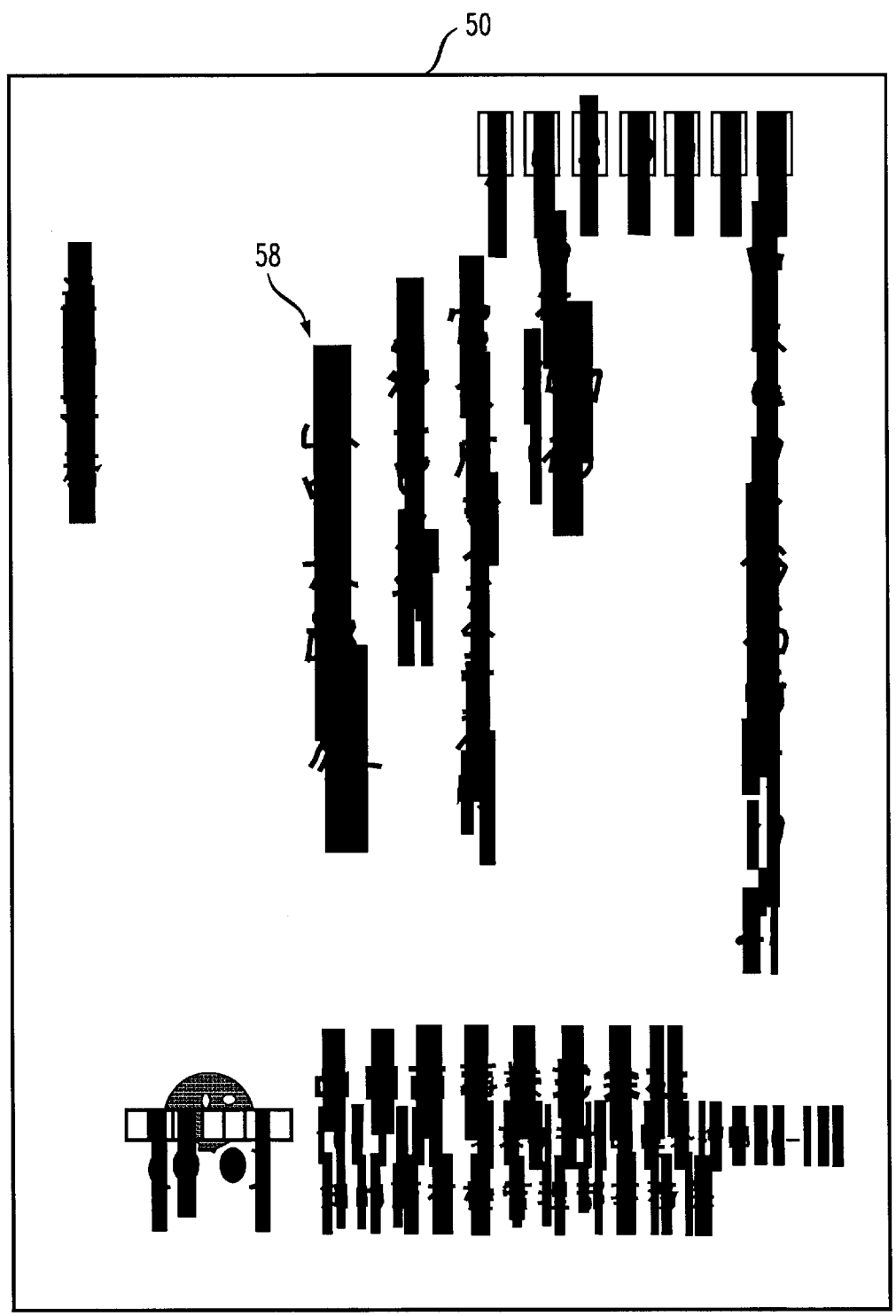
FIG. 6 is a diagram showing the state wherein long vertical connected components (vertically LongCCs) are extracted in the first example.

FIG. 6 is a diagram showing the condition where the rectangles that enclose the character-sized connected components (CharCCs) are extended vertically and reduced horizontally, and the resultant rectangles are superimposed on the original image for easy understanding. As is shown in FIG. 6, the longer side of a circumscribed rectangle is defined as L. Each rectangle is extended vertically at both ends by L, and is reduced horizontally by (⅔)·L. As a result, long vertical connected components (LongCCs) 58 are formed.

In this embodiment, the distance the circumscribed rectangle is extended or reduced is not fixed, and is determined in accordance with the size (L) of the character-sized connected components (CharCCs). This is because, since there is a large variety of character sizes (especially in the sizes of handwritten characters), a fixed value is not appropriate, and because it has been ascertained that the intervals between characters are substantially proportional to the character sizes.

Since the connected components are extended or reduced in the assumed character string direction, the long connected component (LongCC) extraction units 25 and 26 extract long connected components (longCCs) that consist of character-sized connected components (CharCCs), and the vertical connection evaluation unit 27 and the horizontal connection evaluation unit 28 provide evaluation scores (step 107). A high evaluation score is provided for a long connected component (LongCC) that is extended in the assumed character string direction, and, for example, a high evaluation score is provided for a long connected component (LongCC) where connected components are arranged evenly. However, at this time, although certain Chinese characters, which are horizontally arranged in FIG. 3, consist of orthogonal pseudo-character strings that differ from the original character string, these characters are extended comparatively long, like the long connected components (LongCCs) 61 in FIG. 5. Therefore, a high evaluation score is provided for the long connected component (LongCC) 61.

The character string determination unit 30 mixes the long connected components (LongCCs) in the two buffers (the first Hor buffer 23 and the first Ver buffer 24) and sorts them in accordance with the descending order of their evaluation scores (step 108). The long connected components (LongCCs) are examined beginning with the one having the highest evaluation score, and if the evaluation score is equal to or greater than a threshold value stored in the character string threshold value storage unit 29, the pertinent long connected component is determined to be a character string. For long orthogonal connected components (orthogonal LongCCs) that intersect the connected component that has been determined to be a character string, their evaluation scores are reduced in accordance with the sizes of intersecting areas (step 109). As previously described, for a long connected component (LongCC) determined to be a character string, a black rectangle for score reduction (a circumscribed LongCC rectangle) is stored in the orthogonal buffers (the second Hor buffer 31 and the second Ver buffer 32). With this arrangement, the evaluation score of a long orthogonal connected component (LongCC) that intersects the connected component that has been determined to be a character string is reduced in accordance with the size of the area that intersects the black rectangle; for example, a long connected component (LongCC) is reduced by a distance equivalent to the length of the intersecting portion. Then, the character string determination unit 30 re-evaluates the next ranked long connected component (LongCC), while taking into account the score reduction using black rectangles stored in the orthogonal buffers (the second Hor buffer 31 and the second Ver buffer 32), and extracts, as a character string, a long connected component (LongCC) that has a passing score (e.g., the length is equal to or greater than the threshold value, and the score reduction area is equal to or smaller than 20%). Then, for score reduction, the extraction results are written to the orthogonal buffers (the second Hor buffer 31 and the second Ver buffer 32). If the evaluation score is lower than a passing score, the black rectangle for score reduction is not written. As a result, even in an area where character strings are tightly arranged, the character strings can be aligned in the original character direction.

The long connected components (LongCCs) may be employed as black rectangles for score reduction. The order in which the character strings are examined should not be fixed in accordance with the first sorting order; more effective is a method whereby each time a connected component is determined to be a character string, the remaining long connected components (LongCCs) are re-sorted. In this case, however, since the processing speed is to be reduced, this method is preferably employed while taking the processing speed and the effects obtained into account.

Figure 7:
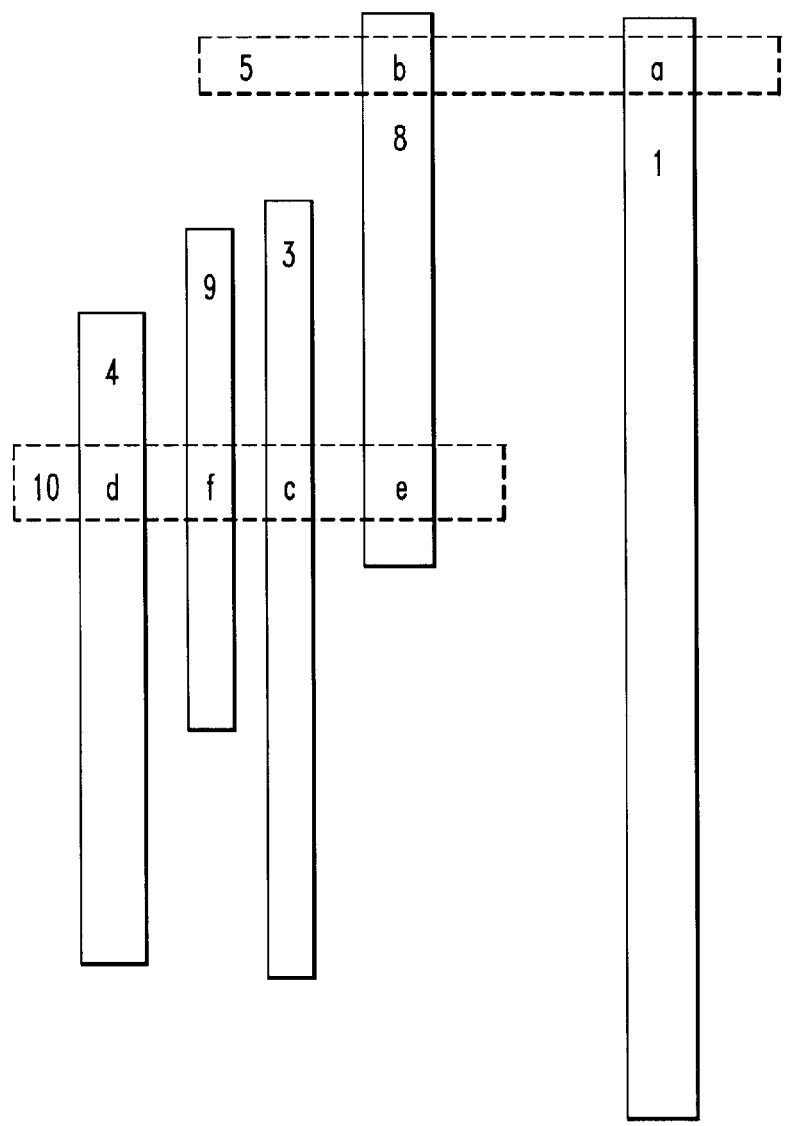
FIG. 7 is a diagram showing the state wherein character strings are selected and ranked in order in the first example.
Figure 7:
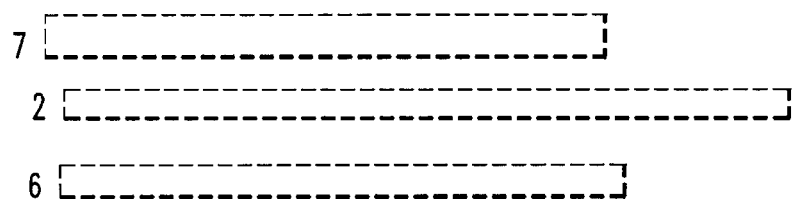

FIG. 7 is a diagram showing the condition where character strings are determined and ordered. Numerals 1 to 10 represent the ranks 1 to 10 of probable character strings, and alphabetical characters a to f represent the portions in the processing order in which probable vertical character strings and probable horizontal character strings intersect. The first, third, fourth and ninth probable vertical character strings, and the second, sixth and seventh probable horizontal character strings are selected as character strings without any score reduction. The score of the fifth horizontal character string that corresponds to the postal code 52 in FIG. 3 is reduced by the intersecting portion "a." However, since the ratio of the intersecting portion is small, the pertinent character string is selected. The eighth vertical character string is selected by reducing its score by the intersecting portion "b." The tenth character string, consisting of certain Chinese characters in FIG. 3, which is the long connected component (LongCC) 61 in FIG. 5, is not selected because the intersecting portions "c," "d," "e," and "f" have reduced its score. As a result, the selection of an orthogonal pseudo-character string that is not an original character string can be prevented.

When a specific threshold value is employed for the evaluation score of a long connected component (LongCC), the intersecting portion of the long connected component (LongCC) may belong to both vertical and horizontal character strings. In this case, in order to prevent the character-sized connected component (CharCC) from belonging to a plurality of character strings (step 110), an address pattern for the piece of mail to which the processed image belongs is deduced by referring to patterns stored in a memory (not shown) that have been registered in advance. As another method that can be used for this purpose, when a connected component belongs to both a vertical and a horizontal character string, the character string determination unit 30 can perform a reexamination of the matching performed for the character strings, so as to ensure that the character-sized connected component (CharCC) belongs to only one character string.

Figure 8:
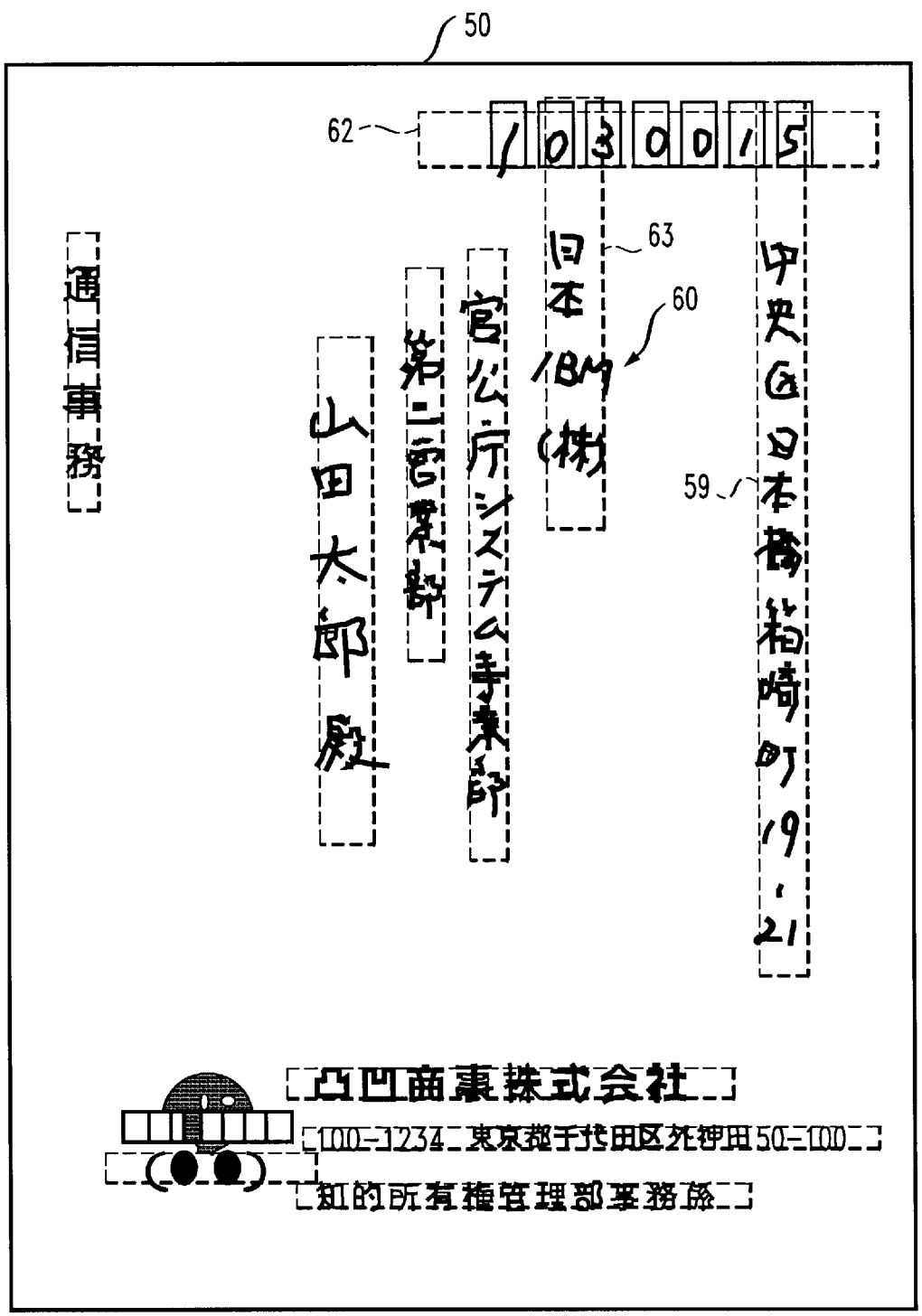
FIG. 8 is a diagram showing the state wherein the extracted character strings are superimposed on the original image in the first example.

FIG. 8 is a diagram showing the condition where the extracted character strings are superimposed on the original image. In FIG. 8, while a postal code character string 62 intersects an address character string 59 and a character string 63, it is concluded from the character string pattern that the image is a combination of a postal code entry and a vertical handwritten address. Assuming that, in the arrangement of long connected components (LongCCs), there is the fifth long horizontal character string located at the top in FIG. 7, and the first, eighth, third, ninth and fourth long vertical character strings that intersect the fifth character string, or that are slightly separated from it. In this case, during the recognition process the long horizontal character string is determined to be a postal code character string; while it is determined that it is highly probable that the long vertical character string that is near it to the right is an address, and that the long vertical character strings that are near it to the left include the name of an addressee. When long connected components (LongCCs) are arranged horizontally along several lines, it is ascertained that the postal code is the top long connected component and that the address and the name of an addressee appear in that order, and the following recognition process is performed. In this manner, practically, the postal code character string 62 is processed first, and character-sized connected components (CharCCs), such as "0," "3" and "5," are removed from the address character string 59 and the character string 63. The constitution of the postal code character string can be deduced from character strings by using the number of character-sized connected components (CharCCs) in a character string, the locations of the character strings, and data concerning address patterns. In advance of the recognition process performed for the remaining character strings, the recognition process is performed for the postal code character string by using a handwritten numeral dictionary, and the recognition process is performed for the addressee name character string by using a handwritten name dictionary. As for an address character string, the recognition process is performed by comparing an address that is found that corresponds to the postal code and by using a handwritten address dictionary.

Although a character string "IBM" 60 in FIG. 8 is horizontal writing, the vertical character string 63 is selected first and the score of the character string "IBM" 60 is therefore reduced, so that the character string 60 is not selected as a character string. For this, an independent process, such as the extraction of a character string, should not be performed; instead, a recognition feedback process should be performed for the character string 63.

As is described above, according to the method for extracting address character strings consisting of handwritten characters, a process can be employed that is flexible and simple, compared with another method according to which character-sized connected components (CharCCs) are assembled logically. Further, in this embodiment, a character string is determined beginning at the long connected component (LongCC) having the highest priority, and the evaluation score of a long connected component (LongCC) perpendicular to the character string is reduced. Therefore, the extraction of a false long orthogonal connected component (LongCC) can be prevented, and as a result, this method provides a practical, satisfactory process by which to extract an address in which character strings are irregularly arranged.

Figure 9:
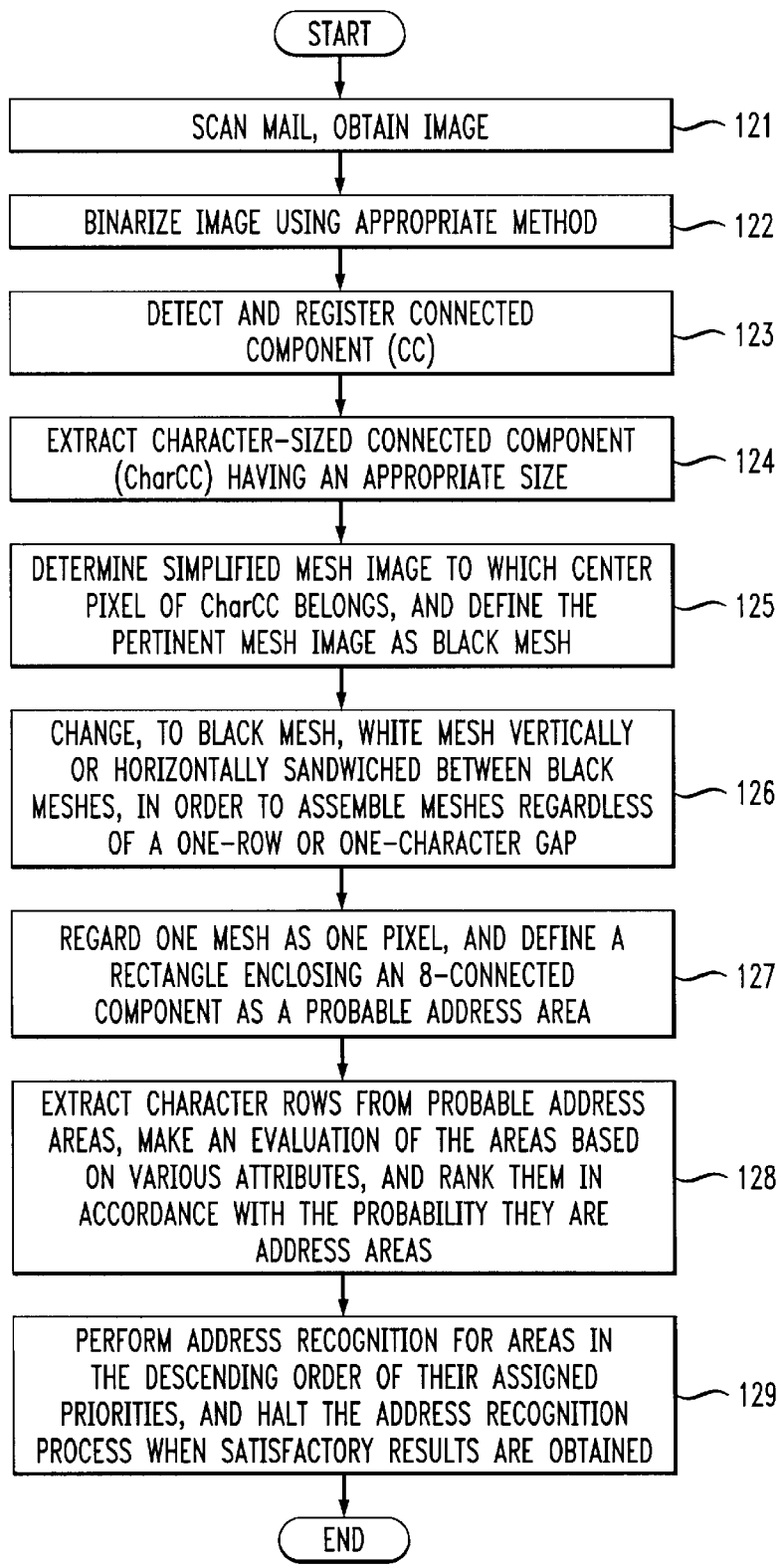
FIG. 9 is a flowchart for explaining the main processing performed to read a mailing address consisting of printed characters according to the embodiment of the present invention.
Figure 12:
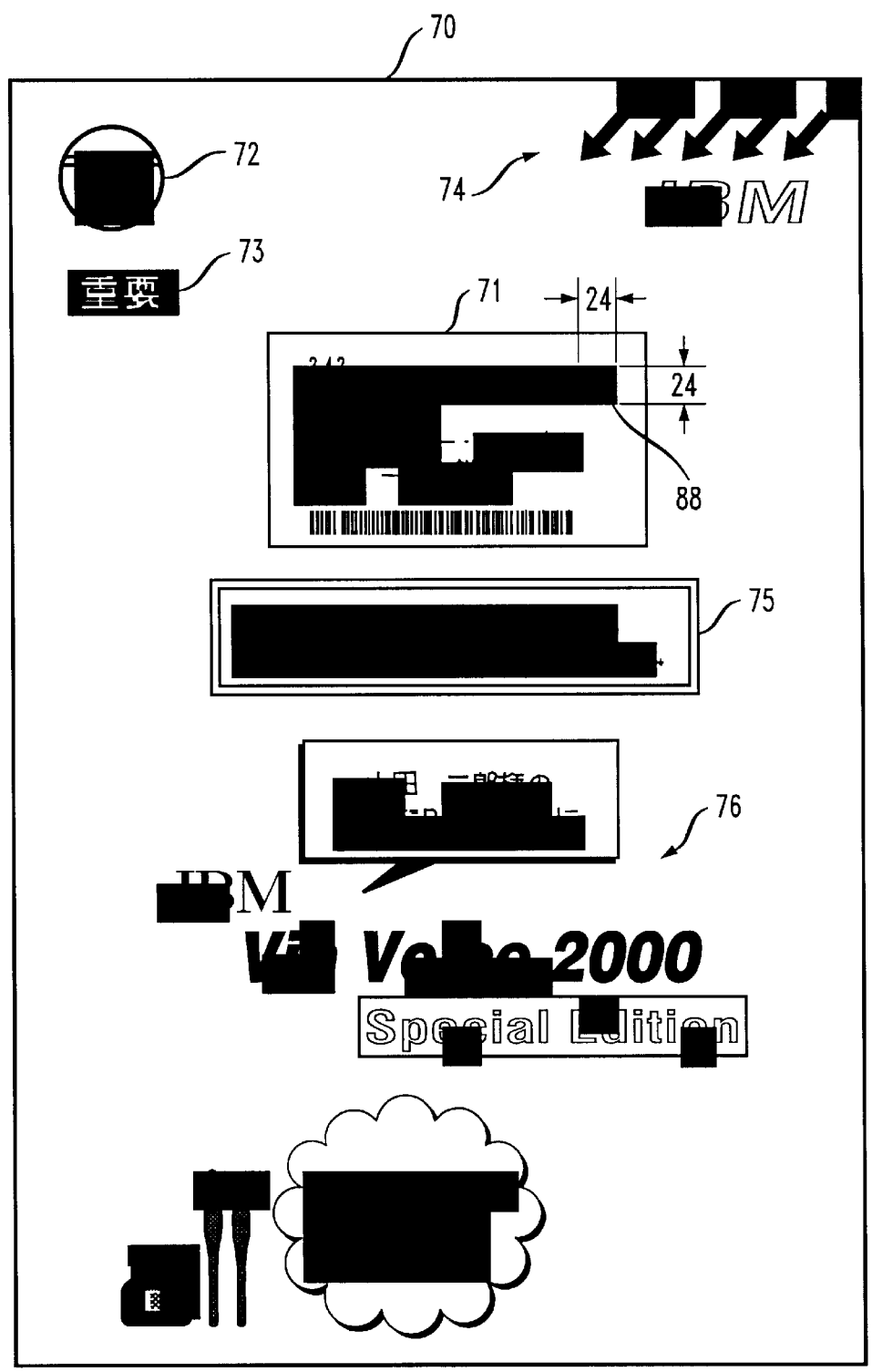
FIG. 12 is a diagram showing the existing state in the second example when mesh images are set to the ON state.
Figure 13:
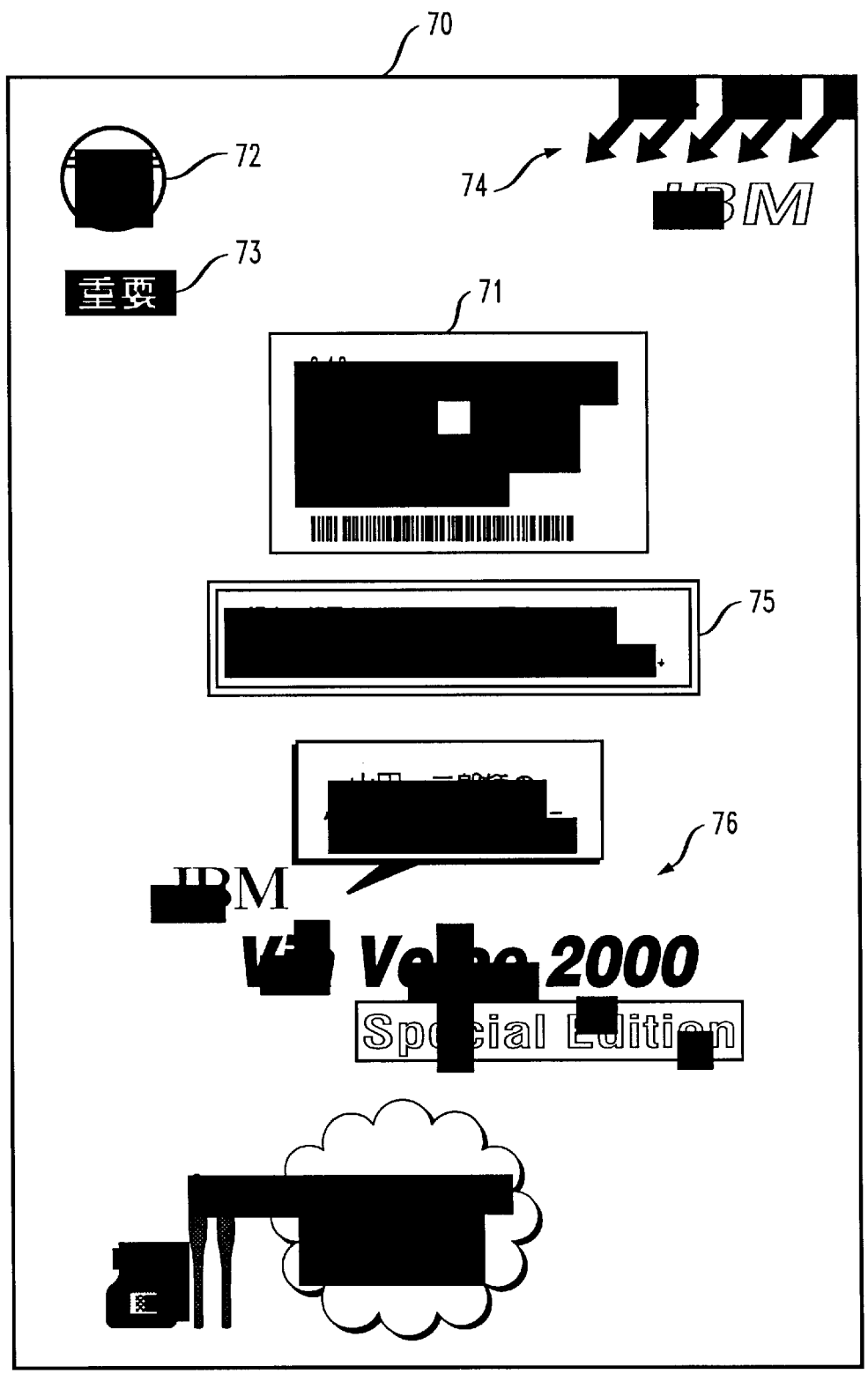
FIG. 13 is a diagram showing the existing state in the second example when the mesh images are assembled and set to the ON state.
Figure 14:
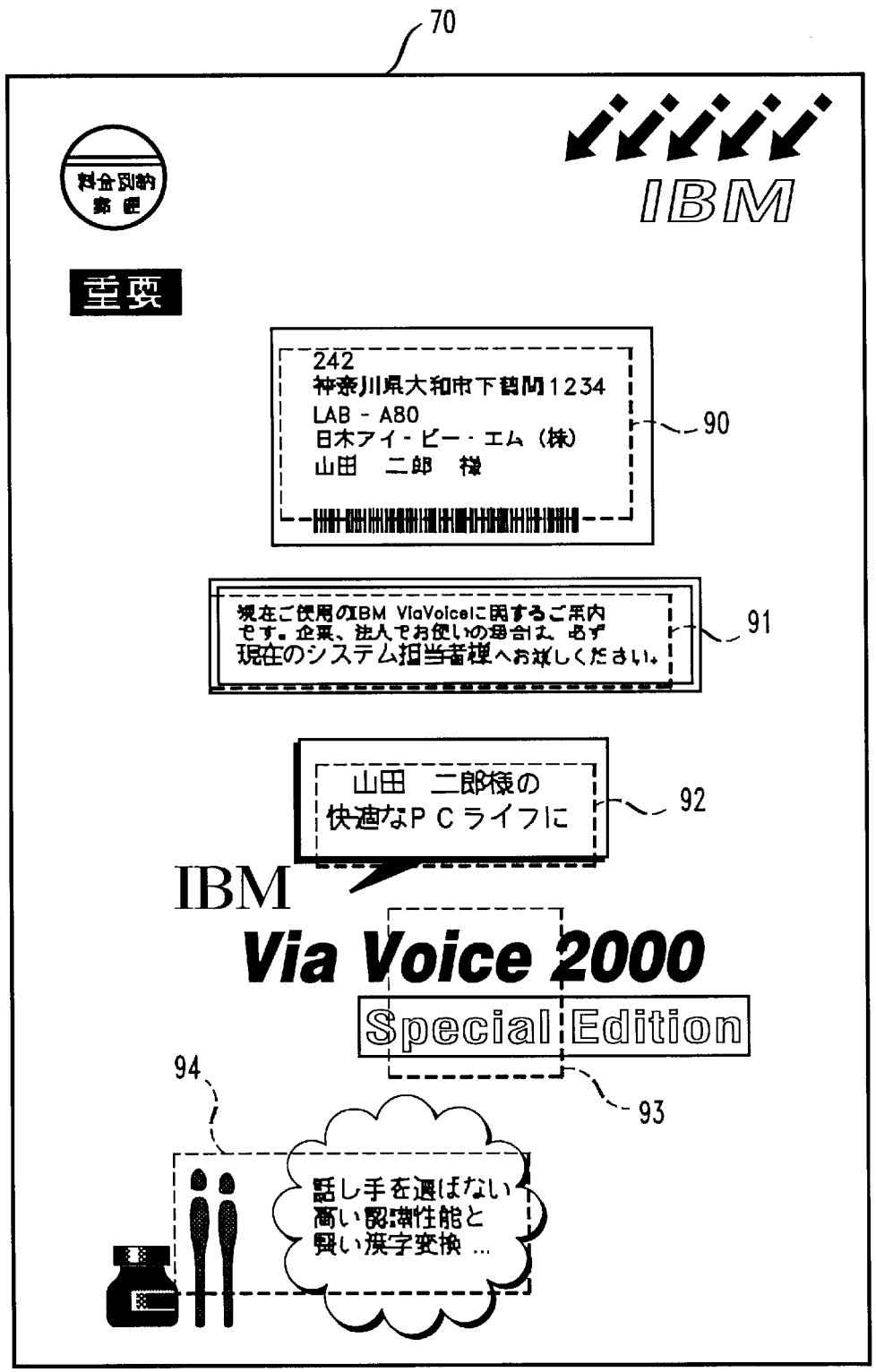
FIG. 14 is a diagram showing probable address areas that are extracted in the second example.

The mailing address reading processing in the embodiment, which is performed mainly for printed characters, will now be described while referring to FIG. 1 and FIGS. 9 to 14. FIG. 9 is a flowchart for explaining the mailing address reading process that in this embodiment is mainly performed for printed characters. FIGS. 10 to 14 are diagrams showing, as the second practical example, an original image (FIG. 10), a condition (FIG. 11) when a character-sized connected component (CharCC) is extracted, a condition (FIG. 12) when a mesh image is set to the ON state, a condition (FIG. 13) when an assembled mesh image is set to the ON state, and the extraction of a probable address area (FIG. 14).

Figure 10:
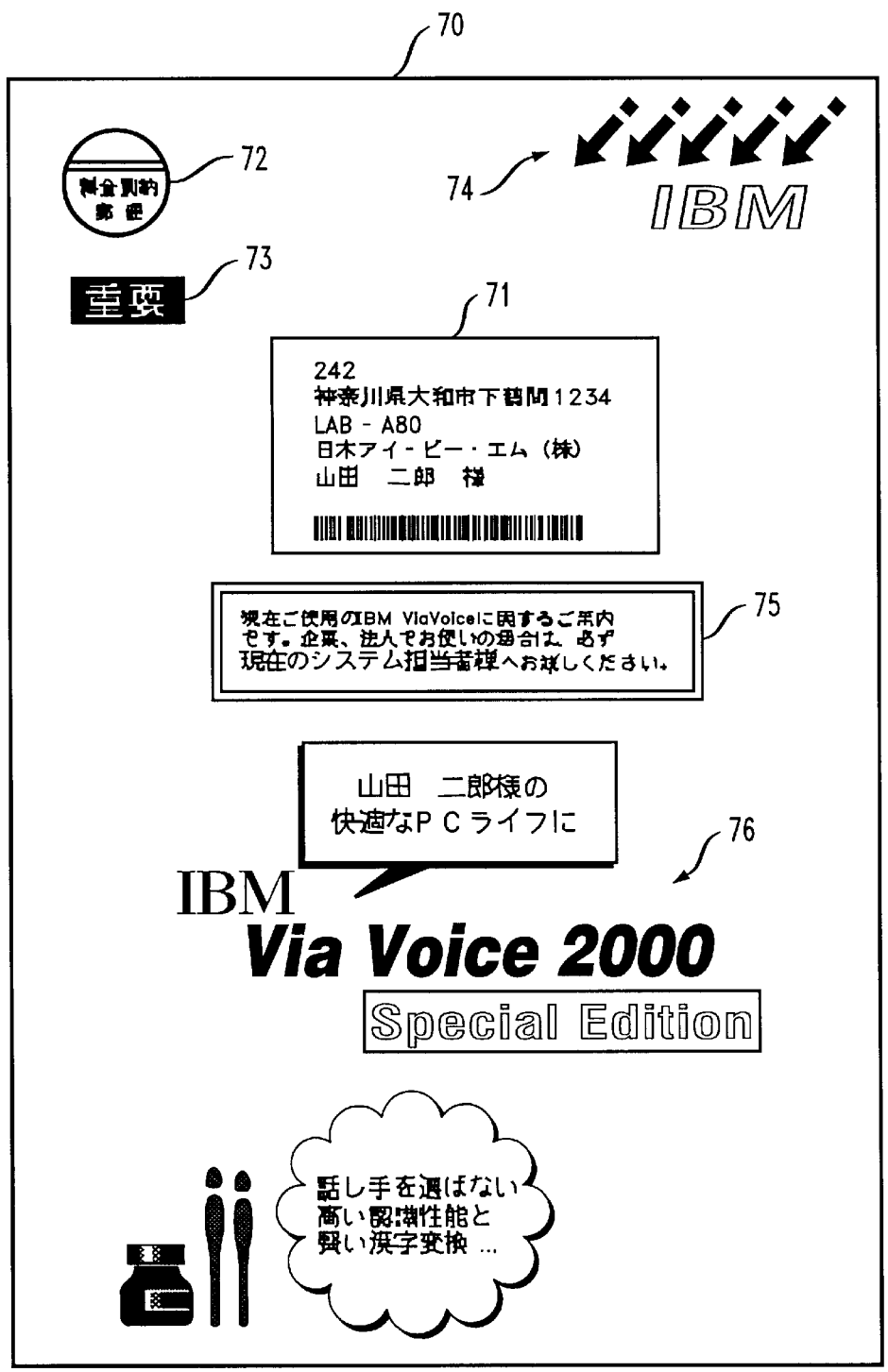
FIG. 10 is a diagram showing the original image for a second practical example.
Figure 11:
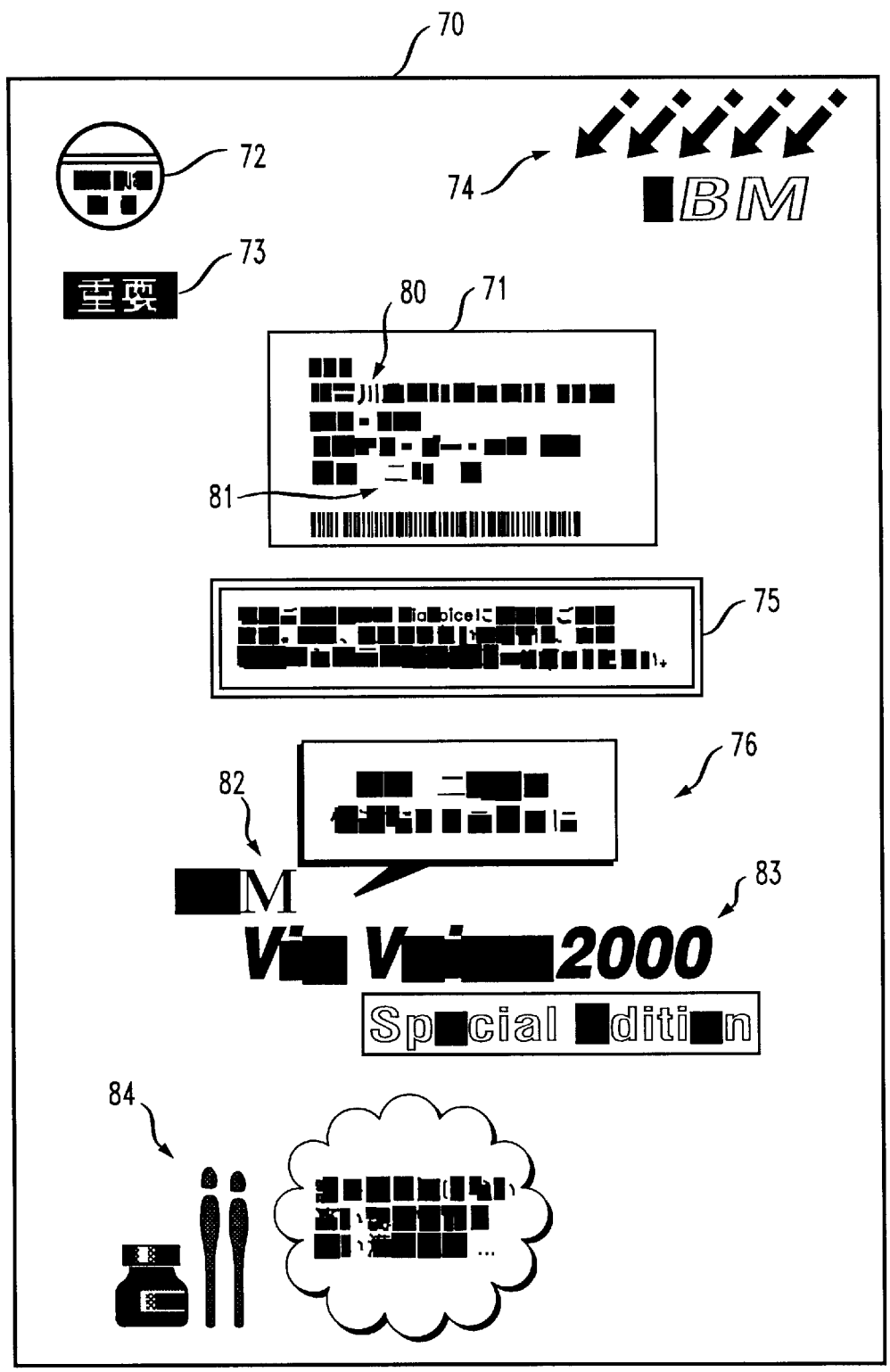
FIG. 11 is a diagram showing the existing state in the second practical example when character-sized connected components (CharCCs) are extracted.

First, mail is scanned by the image input device 2 (step 121). In FIG. 10, various image information items, such as address information 71, separate printed postage paid information 72, distribution information 73, a trademark display 74, correspondence information 75 and printed background information 76, are inscribed on the piece of mail 70. These image data are binarized by the binarization unit 11, which uses an appropriate method (step 122). The connected component detector 13 detects connected components (CCs) and stores them in a memory (not shown) (step 123). And the character-sized connected component (CharCC) detector 14 extracts character-sized connected components (CharCCs) having appropriate sizes (step 124). In the reading of an address area containing printed characters, unlike for the extraction of handwritten characters, the maximum value provided as the threshold value is small (e.g., 30 pixels). FIG. 11 is a diagram showing the condition where the character-sized connected components (CharCC) are formed as black rectangles, which are superimposed on the original image for easy understanding. In this example, many character data are extracted; however, the characters and the pattern in the trademark display 74, a character "M" 82 and a numeral "2000" in the printed background information 76 are excluded characters since in size they exceed 30 pixels. A pattern 84 is also excluded, and in the address information 71, a Chinese character 80 and a Chinese character 81 are not extracted.

The corresponding mesh image detector 42 selects a simplified mesh image, which is a quadrilateral area assumed by the mesh image forming unit 41 and to which the center pixel of the character-sized connected component (CharCC) belongs, and regards the selected mesh as a black mesh (step 125). As is shown in FIG. 12, the image is divided into meshes 88, which are small 24×24 pixel areas, and the border line between the meshes 88 is not displayed. The character portions in which the dash "−" is entered are blank in the address information 71 in FIG. 10. To interpolate this portion, the following process is performed. Specifically, in order to assemble meshes regardless of a one-row or a one-character gap, the mesh image connection detector 43 converts, into black meshes, white meshes sandwiched vertically or horizontally between black meshes (step 126). The results are shown in FIG. 13. As is apparent from a comparison with FIG. 12, regardless of the presence of a one-row or a one-character gap, the meshes are assembled and changed to black. While there is not much need for interpolation between rows in this particular example, normally this process is effective because the row interval can be interpolated by embedding the gap, and the two separate rows can be assembled. Therefore, a probable address area can be understood as constituting a block composed of a single connected mesh (CM).

The specific area extraction unit 45 regards one mesh as one pixel, and determines that a rectangular area enclosing an 8-connected component is a probable address area (step 127). The portions enclosed by broken lines in FIG. 14 are those extracted at this step, and areas 90 to 94 correspond to probable address areas. It is understood that the separate printed postage paid information 72, the distribution information 73, the trademark display 74 and one part of the printed background information 76 are not selected for the piece of mail in FIG. 14. These information items are excluded from the probable address areas because a character string extends along only one row, or a satisfactory number of connected components (CC) is not present.

The character strings in the other areas are extracted, and various attributes stored in the attribute information storage unit 44 are employed to evaluate the individual areas and rank them in order based on the probability that they are address areas (step 128). As is described above, the various attributes are related to whether a character string is near the edge of an image and whether the shape of the character string has the appearance of an address. Through this process, in FIG. 14, beginning from the top, area 90 is determined to be the first probable address area, area 91 the second, area 92 the third, area 93 the fourth, and area 94 the fifth. Then, the image recognition device 3 performs address recognition for the areas in the descending order of their assigned priorities, and when satisfactory results are obtained, the address recognition processing is terminated (step 129). Upon the completion of the above described processing, the address reading sequence for this embodiment is terminated.

As is described above, according to the printed character string extraction algorithm of the present invention, by using a simple algorithm a quadrilateral area containing an address area can be extracted from the surface of a piece of mail bearing an address area, a sender information area and various patterns. That is, since probable address areas are small relative to the size of an image of the surface of a piece of mail, since patterns and noise can be removed from the image, and since whether character strings in the probable address areas are arranged vertically or horizontally can be predicted, an address recognition process can be performed for these probable address areas. As a result, the detection accuracy can be improved, the processing can be simplified, and the processing speed can be increased. With the algorithm used for this embodiment, the probability that an address area will be extracted is high, especially when the characters in the address area are machine printed. Further, a horizontally inscribed handwritten address, such as one used for mail received from western countries, can be precisely extracted.

As is described above, to extract a character string, the printed character string extraction algorithm is employed for a collectively aligned address that is composed of printed characters, or an address on overseas mail, for example, all of which is inscribed horizontally, while the handwritten character string extraction algorithm is employed for an address, such as an address that is handwritten in Japanese, that is irregularly arranged and includes a mixture of horizontal and of vertical writing. As a result, the character strings that are included in an address area can be extracted precisely and quickly, without the type of writing employed for the address having to be selected.

As is described above, according to the present invention, the use of a complicated process for combining pixels is avoided, and character strings, such as handwritten addresses, can be quickly and precisely extracted.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A character string extraction method comprising the steps of:
   extracting connected components from an input image;
   comparing the sizes of said connected components with a predetermined threshold size, and extracting connected components within a range of said predetermined threshold size;

extending vertically or horizontally said extracted connected components within a range of said predetermined threshold size, and connecting the extended connected components to form and extract long connected components, wherein the horizontal dimension of said connected components within a range of said predetermined threshold size is reduced when the vertical dimension is extended; and wherein the vertical dimension of said connected components within a range of said predetermined threshold size is reduced when the horizontal dimension is extended, so that said long connected components can be extracted; and extracting probable character strings based on the connection state of said extracted long connected components.

2. The character string extraction method according to claim 1, wherein, at said step for extracting said connected components within a range of said predetermined threshold size, said connected components within said range of said predetermined threshold size are extracted by comparing the vertical and/or horizontal dimension of said connected components with a predetermined vertical and/or horizontal dimension for an assumed character.

3. The character string extraction method according to claim 1, wherein, at said step of extracting said long connected components, the extension length is determined based on the size of said connected components within a range of said predetermined threshold size, so that said long connected components can be extracted.

4. The character string extraction method according to claim 1, wherein, at said step of extracting said long connected components, the dimension that is reduced is determined based on the size of said extracted connected components that are within a range of said threshold size.

5. The character string extraction method according to claim 4, further comprising the steps of:
dividing the input image into segments while assuming that the segments are mesh images having a predetermined size, and setting to an ON state the mesh images that correspond to the connected components that are within a range of the predetermined threshold size that is extracted; and
extracting the contents of a specific area from the connection state of mesh images that are in the ON state.

6. The character string extraction method according to claim 5, further comprising:
shifting to said step of setting said mesh image to the ON state when said image represents an address composed of printed characters; and
shifting to said step of extracting said long connected components when said image represents an address composed of handwritten characters.

7. A handwritten character string extraction method comprising the steps of:
extracting connected components having a predetermined size from an input image in which handwritten characters are included;
extending said connected components in a first direction and reducing said connected components in a second direction, perpendicular to the first direction, in order to assume a string exists that has a plurality of characters;
detecting the state of said string of characters that is assumed; and
inferring an address pattern from said state of said string of characters that is detected.

8. The handwritten character string extraction method according to claim 7, wherein said state of said string of characters indicates the length and the raised and recessed condition of said string; and wherein a high priority for the performance of character recognition is given to a string that is long and has few raised and recessed portions.

9. The handwritten character string extraction method according to claim 7, wherein a vertical or horizontal dimension of said connected components is extended at a predetermined ratio, while the other dimension is reduced at a predetermined ratio, and wherein the connection state of said connected components that are extended and reduced is employed to assume the existence of said string of characters.

10. A character string extraction apparatus comprising:
a connected component detector for detecting, in a binary image, connected components consisting of black pixels;
a character-sized connected component extraction unit for extracting character-sized connected components having an appropriate size from said connected components detected by said connected component detector;
a connected component extension/reduction unit for extending, in an assumed character string direction, said character-sized connected components extracted by said character-sized connected component extraction unit, and for reducing said character-sized connected components in a direction perpendicular to said assumed character string direction;
a long connected component extraction unit for connecting, in said assumed character string direction, a plurality of the connected components obtained by said connected component extension/reduction unit, and for extracting a long connected component; and
a character string selector for employing said long connected component extracted by said long connected component extraction unit to determine a character string for image recognition.

11. The character string extraction apparatus according to claim 10, wherein said character-sized connected component extraction unit extracts said character-sized connected components based on a threshold value, which is defined while taking into consideration the size of handwritten characters inscribed on mail.

12. An image processing apparatus comprising:
image input means for entering an image;
a connected component extraction means for extracting from said image connected components, entered using said image input means, having a predetermined size;
long vertical connected component generation means for vertically extending and horizontally reducing said connected components extracted by said connected component extraction means to obtain long vertical connected components;
long horizontal connected component generation means for horizontally extending and vertically reducing said connected components extracted by said connected component extraction means to obtain long horizontal connected components;
long connected component extraction means for vertically connecting a plurality of said long vertical connected components obtained by said long vertical connected component generation means, and for horizontally connecting a plurality of said long horizontal connected components obtained by said long horizontal connected component generation means to extract long connected components;

probable character string extraction means for extracting probable character strings based on said long connected components that are extracted by said long connected component extraction means; and image recognition means for performing image recognition for said probable character strings that are extracted by said probable character string extraction means.

13. The image processing apparatus according to claim 12, wherein, from among said long connected components extracted by said long connected component extraction means, said probable character string extraction means outputs a longer connected component for which a high priority is provided.

14. The image processing apparatus according to claim 13, wherein, to determine a priority, said probable character string extraction means reduces evaluation scores of long vertical connected components and long horizontal connected components that intersect.

* * * * *